United States Patent
Harman

(10) Patent No.: US 10,877,130 B2
(45) Date of Patent: Dec. 29, 2020

(54) DRONE DETECTION RADAR

(71) Applicant: QINETIQ LIMITED, Hampshire (GB)

(72) Inventor: Stephen Anthony Harman, Malvern (GB)

(73) Assignee: QINETIQ LIMITED, Hampshire (GB)

( * ) Notice: Subject to any disclaimer, the term of this patent is extended or adjusted under 35 U.S.C. 154(b) by 84 days.

(21) Appl. No.: 16/306,798

(22) PCT Filed: Jun. 1, 2017

(86) PCT No.: PCT/EP2017/063367
§ 371 (c)(1),
(2) Date: Dec. 3, 2018

(87) PCT Pub. No.: WO2017/207718
PCT Pub. Date: Dec. 7, 2017

(65) Prior Publication Data
US 2019/0310347 A1    Oct. 10, 2019

(30) Foreign Application Priority Data

Jun. 2, 2016 (GB) .................................. 1609640.6
May 4, 2017 (GB) .................................. 1707129.1

(51) Int. Cl.
*G01S 7/41*   (2006.01)
*G01S 13/42*  (2006.01)
(Continued)

(52) U.S. Cl.
CPC .............. *G01S 7/415* (2013.01); *G01S 7/352* (2013.01); *G01S 13/422* (2013.01);
(Continued)

(58) Field of Classification Search
CPC . G01S 7/41; G01S 7/411; G01S 7/412; G01S 7/415; G01S 7/023; G01S 13/66;
(Continued)

(56) References Cited

U.S. PATENT DOCUMENTS 5,173,706 A * 12/1992 Urkowitz ................ G01S 7/032
                                                342/101
5,995,062 A    11/1999 Denney et al.
(Continued)

OTHER PUBLICATIONS

International Search Report and Written Opinion for PCT Patent App. No. PCT/EP2017/063367 (dated Sep. 5, 2017).

*Primary Examiner* — Erin F Heard
*Assistant Examiner* — Michael W Justice
(74) *Attorney, Agent, or Firm* — Kenealy Vaidya LLP

(57) ABSTRACT

A drone detection radar can include a plurality of antenna systems, each antenna system being arranged to transmit a signal into an associated sector, and to receive signals reflected from targets in the sector, the sectors collectively forming a monitored volume, and wherein a sub-set of the antenna systems are active at any one time, with the active sub-set of antenna systems being arranged to monitor their respective volumes for a duration sufficient to measure Doppler signals associated with slow moving drones, with the radar being arranged to switch to a different sub-set of antenna systems after each duration, such that the whole volume is monitored within a predetermined period. Combining a staring array from an antenna system with a plurality of switched antenna system allows drones to be both detected and tracked, with appropriate selection of the predetermined period.

12 Claims, 4 Drawing Sheets

(51) Int. Cl.
  *G01S 13/52* (2006.01)
  *G01S 13/87* (2006.01)
  *H01Q 21/20* (2006.01)
  *G01S 13/56* (2006.01)
  *G01S 7/35* (2006.01)

(52) U.S. Cl.
  CPC .......... *G01S 13/424* (2013.01); *G01S 13/426* (2013.01); *G01S 13/52* (2013.01); *G01S 13/56* (2013.01); *G01S 13/878* (2013.01); *H01Q 21/205* (2013.01); *G01S 2007/356* (2013.01)

(58) Field of Classification Search
  CPC .... G01S 13/422; G01S 13/426; G01S 13/874; G01S 13/878
  USPC .................................. 342/28, 84, 99, 114
  See application file for complete search history.

(56) References Cited

U.S. PATENT DOCUMENTS

| | | | | |
|---|---|---|---|---|
| 2003/0218565 | A1* | 11/2003 | Budic | G01S 13/524 342/90 |
| 2010/0066590 | A1 | 3/2010 | Brown et al. | |
| 2012/0001790 | A1* | 1/2012 | Edwards | G01S 7/415 342/93 |
| 2015/0323658 | A1* | 11/2015 | Mitchell | G01S 13/937 342/128 |

* cited by examiner

DRONE DETECTION RADAR

CROSS REFERENCE TO RELATED APPLICATION(S)

This application is a national phase filing under 35 C.F.R. § 371 of and claims priority to PCT Patent Application No. PCT/EP2017/063367, filed on Jun. 1, 2017, which claims the priority benefit under 35 U.S.C. § 119 of British Patent Application No. 1609640.6, filed on Jun. 2, 2016 and British Patent Application No. 1707129.1, filed on May 4, 2017, the contents of each of which are hereby incorporated in their entireties by reference.

The presently disclosed subject matter relates to a system and method for the detection of targets using a radar system. More particularly, it relates to a system and method for operating such a radar in a manner that improves the probability of detection of drones as the target object.

Over the last few years the availability of model helicopters, remote piloted air systems (RPAS), Unmanned Aerial Vehicles (UAVs), multi-rotors and similar remote controlled aircraft of various types and sizes has increased dramatically, partially due to the decreasing cost of the technology that enables them to be flown without a great deal of skill and training. Such aircraft (herein otherwise referred to generally as drones) are often bought as toys, but they are often capable of carrying payloads such as cameras or other relatively light objects. This capability makes them useful for transporting objects into difficult to access locations, or carrying out monitoring or surveillance work.

It has not taken long for them to be used for socially undesirable or illegal tasks. A growing problem is the use of drones to deliver contraband into prisons, by flying the drone over a wall and landing it in an exercise yard or similar area. Other undesirable uses of drones include incursions into protected airspace, or invasion of privacy at sensitive areas.

A requirement has therefore arisen to be able to detect the use of drones.

Acoustic sensors may be useful at very close range, but their utility deteriorates in noisy, urban environments. Video systems, including infra-red imaging systems, are useful for confirming a detected presence of a drone, but also suffer when in visually cluttered environments or in poor weather and darkness, and again often have difficulty detecting drones at longer ranges (such as more than several tens of metres), A wide angle lens provides good angular coverage but is unable to sense the drone at the longer ranges, whereas telephoto lenses provide good performance at long distances, but only with a very narrow field of view.

Radar systems can be used, but as the velocity of drones is so variable, and is often zero, they can easily get caught by the clutter filtration that radars often use to remove returns from static objects. Their velocities, and flight characteristics also often match birds, and so radars have been prone to high false alarm rates when used against drones.

The disclosed subject matter aims to provide a means for detection of drones that at least ameliorates one or more of the disadvantages of the related art.

According to the disclosed subject matter there is provided a drone detection radar including a plurality of antenna systems, each antenna system being arranged to transmit, using a transmitter, a signal into an associated sector, and to receive, using a receiver, signals reflected from targets in the sector, wherein the sectors associated with the antenna systems collectively form a monitored volume, and wherein a sub-set of the antenna systems are active at any one time, with the active sub-set of antenna systems being arranged to monitor their respective volumes for a duration sufficient to measure Doppler signals associated with slow moving drones, with the radar being arranged to switch to a different sub-set of antenna systems after each duration, such that the whole volume is monitored within a predetermined period.

The disclosed subject matter therefore provides benefits associated with staring radars, i.e. radars that have a long static view of a scene, and are hence able to measure signals having low Doppler frequencies, whilst also providing the benefits of radars that have antennas that are able to change the direction of sensitivity, thus allowing a wider volume to be scanned, as compared to a normal staring radar.

Advantageously, in some embodiments the whole volume may be monitored within every two seconds, or within every second, half second, or quarter second, The nature of drones, and their usual flight patterns and velocities, is such that several (e.g. 3, 5, 10 or 15) separate panels, and hence sectors within the volume of interest, can be cycled through whilst still maintaining a sufficient dwell time in each, and also maintaining a sufficient track on a target. Preferably or advantageously, a dwell time in each sector of between 50 ms and 0.5 s is provided, and more preferably or advantageously the dwell time is between 70 ms and 0.2 s. Some embodiments may have a dwell time of approximately 0.1 s. The Doppler signals associated with the drone may be those from the body, from one or motors on the drone, or from one or more blades on the drone, and may include one, two, or all three of these.

Some embodiments may have a variable dwell time in each sector. For example, the radar system may be arranged to change dwell times in those sectors where a target has been confirmed. The dwell time may be increased, for example, to allow improved measurement accuracy of a target. Alternatively, it may be decreased to allow a greater dwell time, and hence sensitivity, in other sectors where no targets have been detected, but where it is suspected (e.g. based upon other intelligence) that they are present. Tracking accuracy may be achieved by increasing the rate at which a given sector (e.g. one in which a target has been detected) is visited, such as by decreasing the dwell time in some or all sectors, or by changing the switching sequence to prioritise those sectors where a target has been detected.

Conveniently, each sub-set of antenna systems may include of a single radar antenna system (generally including a transmit and receive antenna pair, although in some embodiments the same antenna could be used for both purposes). Thus such an embodiment may include a radar having n antenna systems, where each antenna system is activated in turn, for a at least a minimum period of typically 0.05 s, and wherein a full switching cycle is completed in not more than 2 seconds. The minimum period and duration of the full cycle may therefore be tailored to the number of antenna systems making up the radar, and the size of the volume being monitored.

Each receive antenna in an antenna system is preferably or advantageously arranged to receive signals from targets within a sector covering a fifteenth, tenth, or more preferably or advantageously a fifth, quarter or third of a volume of interest. Thus, the full volume of interest may be cycled round relatively quickly, as compared to many radars that have mechanically or electronically scanned antennas. This allows relatively quick updating, whilst still providing sufficient dwell time within a particular antenna system's monitoring sector to detect the target drone.

Advantageously, the radar may include a plurality of panels, wherein, on each panel, there is a transmit antenna and a receive antenna, together including a single antenna system. This is particularly advantageous where the transmitted signals are CW (carrier wave), such as FMCW, or where the receive antenna is operated as a phased array (which may or may not be a variable phase (steerable) phased array). Alternatively, a common antenna may be used for both transmit and receive. Advantageously, each panel has a plurality of elemental receive antennas that collectively make up the receive antenna, which are arranged to produce a plurality of receive beams. Conveniently, the receive beams may be configured as fixed, staring receive beams, that may be combined in the processor (or a separate beamformer) in a beamforming operation, to provide improved angular resolution of detected targets within the sector. The elemental receive antennas may advantageously be arranged to allow their elemental beam patterns to be vectorially summed or otherwise combined, so permitting the use of super-resolution techniques, such as monopulse or the like, to provide increased angular accuracy. Multiple receive beams may be produced by such combinations. The combination may also advantageously include adjustment of the phase or amplitude of the received signals, so as to change the effective direction of maximum sensitivity of the combined beam(s). Preferably or advantageously, the plurality of elemental antennas are arranged in an n by m array, where n and m are at least 2, and may be equal. Thus, super-resolution processing in both azimuth or elevation may be performed. Note that a panel may be a physical panel that may be e.g. separable as a unit from the radar, or may include an area of the radar, the area forming a notional panel.

Advantageously, each antenna system may be arranged to monitor a sector approximately 60° in azimuth and 45° in elevation. Further advantageously, the radar may include five antenna systems, arranged to monitor a volume of 180° in azimuth, and 90° in elevation. Alternatively, the radar may include ten antenna systems, arranged to monitor a volume of 360° in azimuth and 90° in elevation.

Each panel may further include front-end RF circuitry commensurate with a radar system. The transmit side may therefore include of an up-converter and a power amplifier, and the receive side may include of a low noise amplifier and down-conversion means. Some embodiments may employ an analogue beamformer, and/or a digitiser on the panel. Some embodiments may have digital beamforming done on the panel, whilst others may have such functionality employed centrally, for all panels. Some embodiments may have the beamforming function distributed across a plurality of different beamforming operations, which may be either all digital, all analogue, or a combination of the two.

To keep costs low each panel may advantageously be substantially identical, and may be arranged to connect to a central control unit including at least the processor and memory. The radar may also include central waveform generation means, such as a signal generator, which is then distributed to the panels.

The panels may conveniently be arranged on or in an enclosure, that holds the panels at predetermined positions. The enclosure may house the processor, storage, and other elements such as a power supply.

Some embodiments of the disclosed subject matter may have a processor that is arranged to control the panels to activate them in sequence, cycling through the volume under observation one or more sectors at a time. Some embodiments may choose to operate a single panel at a time, so as to keep the data processing requirements to more modest levels to reduce cost. Others may choose to operate two or more panels simultaneously, e.g. to have an increased update rate.

The processor may be arranged to provide an alert if the signals are characteristic of being reflected from a drone, or may be arranged to show targets on a display.

For those embodiments that employ an array of elemental receive antenna elements, together forming a receive antenna, other forms of multiple beam processing may be employed, such as electronic switching of a receive beam direction, or otherwise scanning a receive beam. Such a technique is useful for obtaining improved accuracy measurements of a target that has been confirmed as being of interest. Conveniently, each panel may be arranged to provide multiple beams simultaneously, which may be processed e.g. as described above to provide additional gain and/or angular precision. Each panel may be arranged as a staring array, that is switched in and out in sequence.

Some embodiments of the disclosed subject matter may have an interface for connection with other radars, to allow the system to synchronise with similar, connected radars to avoid unwanted interference therebetween. This may be achieved by, for example ensuring that the radar does not transmit into a sector (and/or adjacent sector) that is being illuminated by another radar, or at which another radar is sited, to avoid sending energy directly towards another radar whilst that other radar is receiving from the direction of the first, or towards a target being illuminated by another radar, which may cause noise or interference. It may also be used to provide a bistatic or multistatic facility, with one radar acting, at a given instant, as a transmitter, whilst one or more other radars are arranged to receive the signal (or reflections thereof from targets).

Thus, some embodiments of the disclosed subject matter may include a plurality of radars, each of the type described above, wherein each of the plurality of radars are arranged within a neighbourhood, and are synchronised, using an interface, such that no two radars may transmit into a sector visible to two or more radars within the neighbourhood at a given time.

Furthermore, some embodiments of the disclosed subject matter may include a plurality of radars each of the type described above, wherein each of the plurality of radars is arranged within a neighbourhood, and are synchronised, using an interface, such that no two radars are permitted to transmit towards each other simultaneously within the same or a nearby frequency band.

The interface connecting two or more radars together may also be used to provide a communications link between radar systems forming a network, wherein each radar in the network may be controlled so as to synchronise its switching with other radars in the network. Each radar may additionally be controlled to as to use different transmit frequencies or bands to others on the network, where interference may otherwise occur. One or more radars in a group may be arranged to adapt its or their operating frequencies, either by manual control from a human controller, or via automatic detection or prediction of interference based upon reception of interference, or prior knowledge (e.g. transmitted through the network) of the operating characteristics of neighbouring radars. The interface may also be used to share data concerning detected targets, to allow multiple radars to co-ordinate detected targets and tracks between them.

In some embodiments a separate controller may be used to control each radar, and determine a transmission timing arrangement to avoid the clashes mentioned above. The separate controller may also control the frequency channels or bands of each radar system in the network. Alternatively, one of the radars in the network may function as a control radar that performs these functions.

Some embodiments of the disclosed subject matter may have an interface (which may be the same, or different interface to that mentioned above) to allow integration with a computer that provides a user interface. The computer may also allow integration with other sensors, such as audio or video sensors.

Some embodiments of the disclosed subject matter may have an interface (which may be the same, or a different interface to those mentioned above) allowing connection to a separate system that may be used to further identify the target, such as an electro-optic system, or to a system used to counter the target in some manner. The electro-optic system may include of e.g. a camera. The system for countering the target in some manner may include of any suitable drone countermeasure, such as an electromagnetic, laser or sonic jammer or directed energy weapon, or a system that directs a projectile or net at the target, or means to mount a cyber attack on the drone's communications or internal processing, or any other suitable system. It may also include means to notify a human operator of the presence of the target, to the target's current position, the targets likely origin position (by examining its positional history), and/or the target's current speed, height and/or direction. It may also guide the operator to the current position or origin.

Some embodiments of the disclosed subject matter may have an interface (which may be the same, or a different interface to those mentioned above) that allows a connection between radars that facilitates cooperation regarding the monitoring of particular sectors of interest. For example, a first radar that is sited close to a large building may be arranged to have a shorter range, to exclude the processing of returns from the building, whereas a second radar may be arranged to monitor beyond the building in sectors not covered by the first radar.

The disclosed subject matter will now be described in more detail and by way of example only, with reference to the following Figures, of which:

Figure 1:
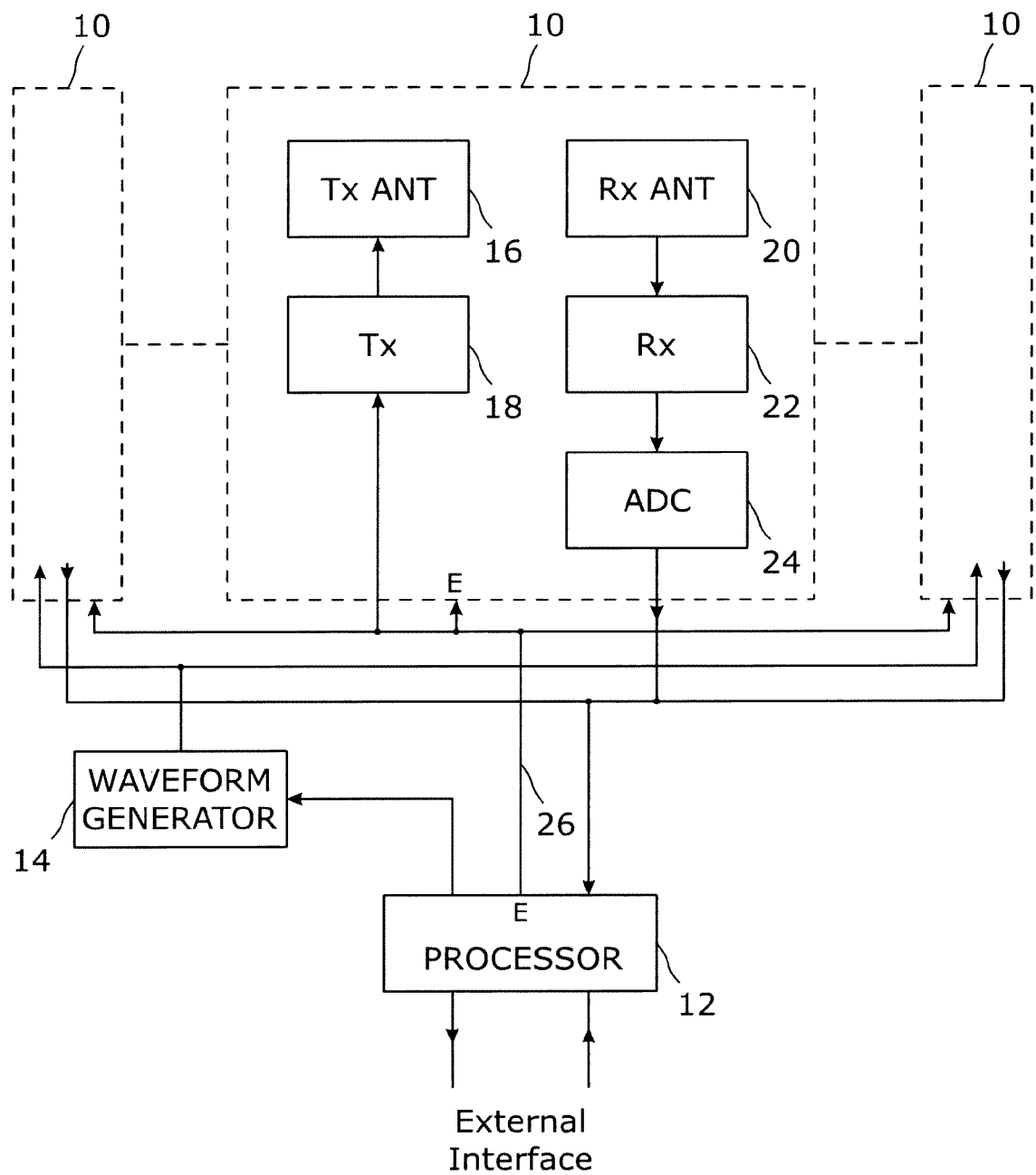
FIG. 1 shows a block diagram of an embodiment of a radar according to the presently disclosed subject matter.

FIG. 1 shows a simplified block diagram of an embodiment of the presently disclosed subject matter. This embodiment has five panels 10, of which one is shown in detail. Each panel is substantially identical in nature, and has front end electronics and antennas, forming an antenna system, mounted thereon. Common to all panels is a processor 12, that also acts as an interface to a common waveform generator 14, as well as providing an interface to external systems, such as a display and controller, and to other radars.

Each panel 1 includes a transmit antenna 16, and transmitter circuitry 18, including a transmit amplifier. A receive antenna 20 is located adjacent the transmit antenna 16, and is connected to receiver front end circuitry 22 which contains amplification and down-conversion circuitry. A digitiser 24 is connected to an output of the receiver 22, which digitises the output and provides its digitised outputs to processor 12.

The processor also controls an enable function 26, that enables one (or, in some other embodiments, more than one) of the panels, while disabling the remaining ones.

It will be apparent to a normally skilled person that there are various interconnections between the components shown, and functions (such as power supplies, switching and routing components etc), that have not been shown but may be necessary to produce a functional system.

In operation, the processor 12 chooses a panel to activate, by suitable control of its enable line to each panel. With one panel having been enabled, the processor controls the waveform generator to generate appropriate waveforms for upconverting and transmission by the transmitter 18 and antenna 16 on that panel. The receiver antenna 20, and the receiver front end 22 receive signals such as any reflections of transmitted signals from objects in a volume to be monitored. The receive antenna 20 includes of nine subantennas, in a square 3×3 array, each of which has its own receiver circuitry The receiver circuitry 22 amplifies, filters, and downconverts, the received signals from each subantenna, ready for digitisation by the digitiser 24. The digitiser 24 passes the digitised information back to the processor for processing. This processing includes at least running filtering, beamforming, detecting, and target tracking, routines on the data from the panel.

The processor controls the duration of activation of the currently active panel (i.e. the dwell time), and, after that duration has elapsed, it switches to another panel and repeats the above process, storing any detected targets in memory. It cycles through the panels in sequence until all five have been activated, and then proceeds to repeat the cycle. Targets detected from the data in one panel may be tracked as they move to a different sector, as observed by another panel.

If a target of interest is found in one panel, then the processor may be arranged increase the dwell time for that panel, and may reduce the dwell time in another panel or panels where no targets have been detected.

Figure 2A:
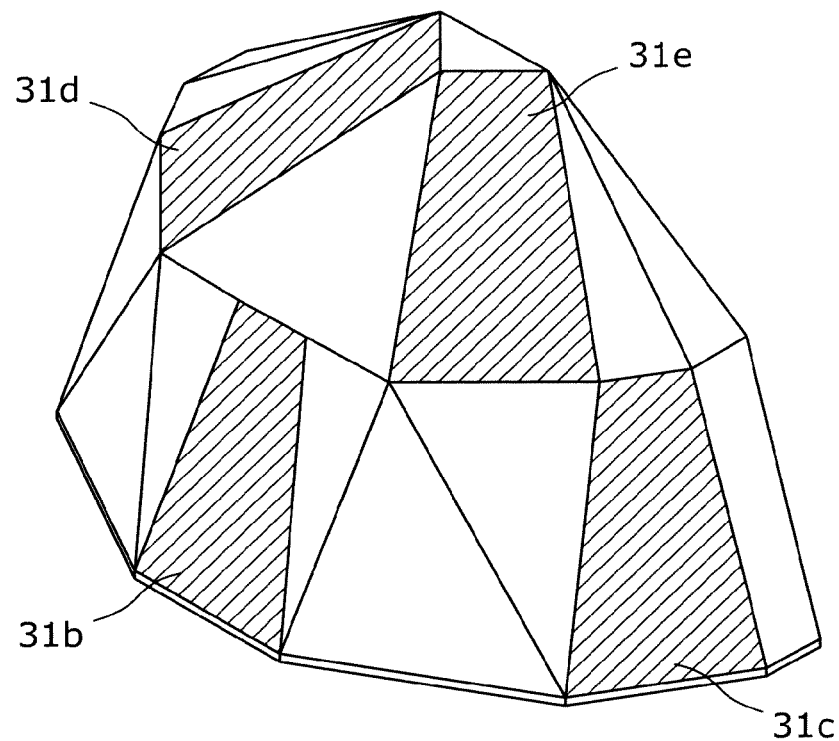
FIG. 2 shows an enclosure design for an embodiment of the presently disclosed subject matter.
Figure 2B:
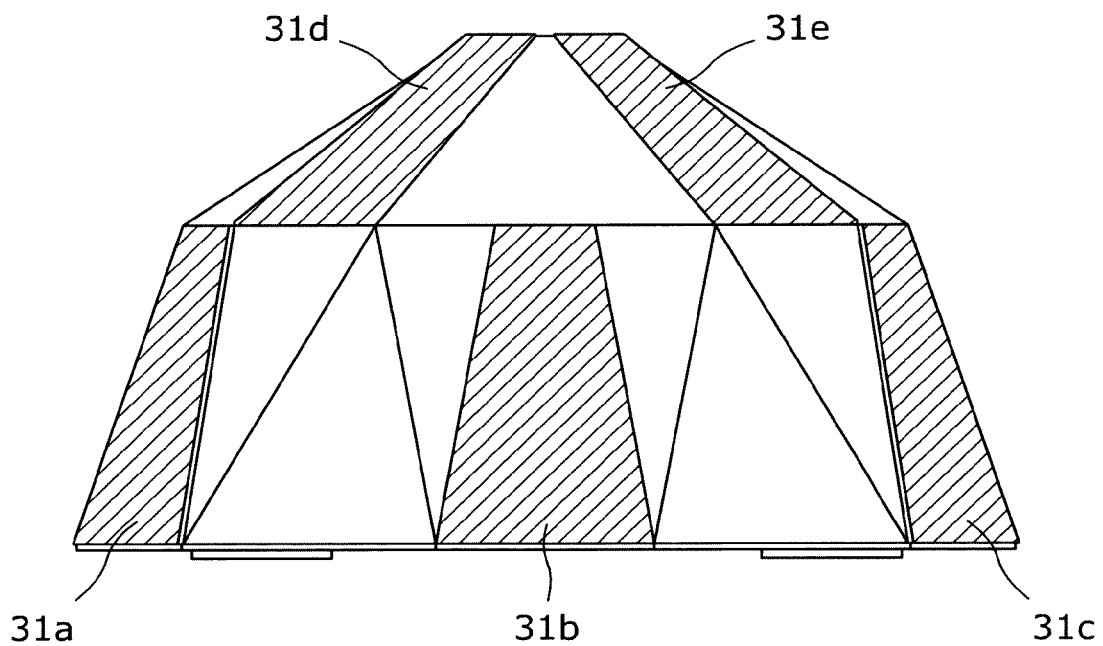

FIG. 2 shows two views of a layout of an enclosure 30 of an embodiment of the presently disclosed subject matter. FIG. 2a shows a perspective view, whilst FIG. 2b shows a face-on view. Five panels 31a-e are arranged around a quarter sphere. Each panel 31 includes transmit and receive antennas, as described above, and has a coverage of 60° in azimuth, and 45° in elevation. Three panels 31a-c are located in a lower row, whilst two panels 31d-e are located in an upper row. The enclosure is suitable for mounting on a wall, fence, or similar vertical surface, or a pole or mast.

A further embodiment (not shown) includes an enclosure that includes a hemisphere, with ten panels mounted thereon, with six panels occupying a lower row, and four occupying an upper row. Thus, it effectively includes two of the enclosures of FIG. 2 mounted back to back. Such an embodiment is useful for when 360° azimuthal coverage is required.

Other embodiments may have other configurations of panels, or may have panels (or antennas) having different angular coverage.

Figure 3:
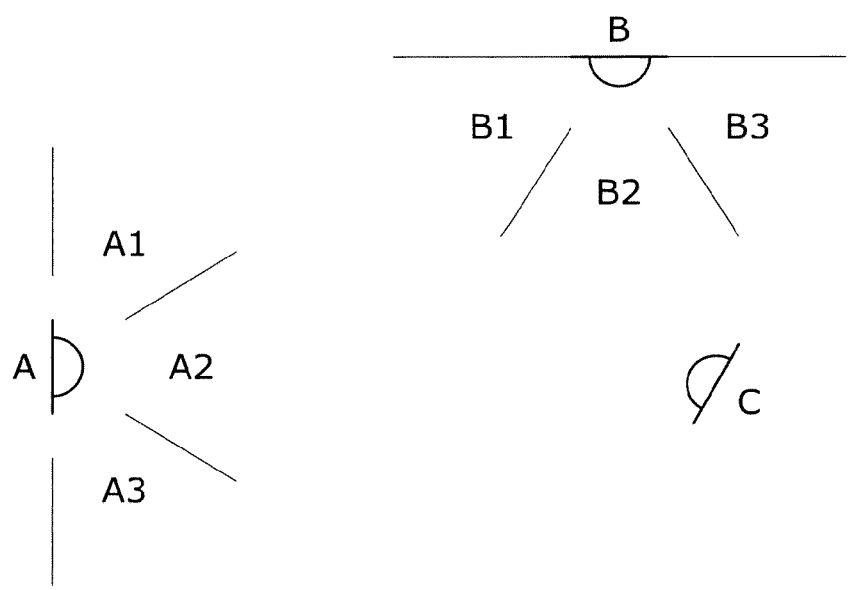
FIG. 3 shows an arrangement of three radars of the presently disclosed subject matter arranged to view a neighbourhood.

FIG. 3 shows an arrangement of three radars, A, B and C, each including an embodiment of the presently disclosed subject matter, that are arranged to view respective volumes, that make up a neighbourhood. Each radar is networked to the others using an interface (not shown) on each radar. Thus, each radar has knowledge of various parameters, such as the frequency band, and active beam direction at a given time, of the others. Each radar has an azimuthal scan volume that covers the other two radars. Thus, without any ameliorating measures being taken, it will be possible for one radar to illuminate a sector containing the second radar whilst the second radar is also illuminating a sector containing the first. Under such circumstances, the radiation transmitted from one radar may interfere with wanted signals received at the second radar. This is particularly problematic when the first and second radars are using the same frequency band, but can also be problematic when the frequency bands used by the first and second radars differ by less than some frequency difference.

Thus, each radar is arranged to select a given sector for activation based upon knowledge of where the other radars are transmitting at that instant. It will wait until any radars in a given sector are not directing radiation at it, before it transmits into the sector. Some embodiments may be arranged such that a given radar may also not transmit into a sector containing another radar if that other radar is illuminating its own sector that lies within or adjacent to the position of the given radar. This reduces the level of radiation that will be received by a given radar from transmit antenna sidebands of other radars.

For example, radar A has switchable sectors A1, A2 and A3, and radar B has switchable sectors B1, B2 and B3, where each sector corresponds to an active panel e.g. as described in relation to FIG. 1. Radar A is present in sector B1, and radar B is present in sector A2. Thus, the radars are arranged such that radar A does not activate its panel corresponding to sector A2 at the same time that radar B activates its panel corresponding to sector B1. Likewise, radar C also has similarly configured sectors, which have not been shown (for simplification of the figure), but it would also not activate any sector that illuminates another radar when that other radar is activating its own sector that illuminates radar C.

Further embodiments of networked radars may be arranged to operate on a bistatic, or multistatic arrangement, wherein transmissions from one radar are received by one or more other radars. This may have benefits including improved vulnerability to some forms of electronic attack, or can be used to provide improved radar coverage including dwell time within a given sector, or cycle time between sectors.

The radars forming the network may be arranged, as described above, to each control their own transmissions to avoid or reduce interference. Alternatively the radars forming a network may be configured such that there is one master radar (or other controller separate from the radars) that has knowledge of the arrangement of the radars, and commands each radar in the network appropriately to avoid any of the conflicts described above.

Figure 4:
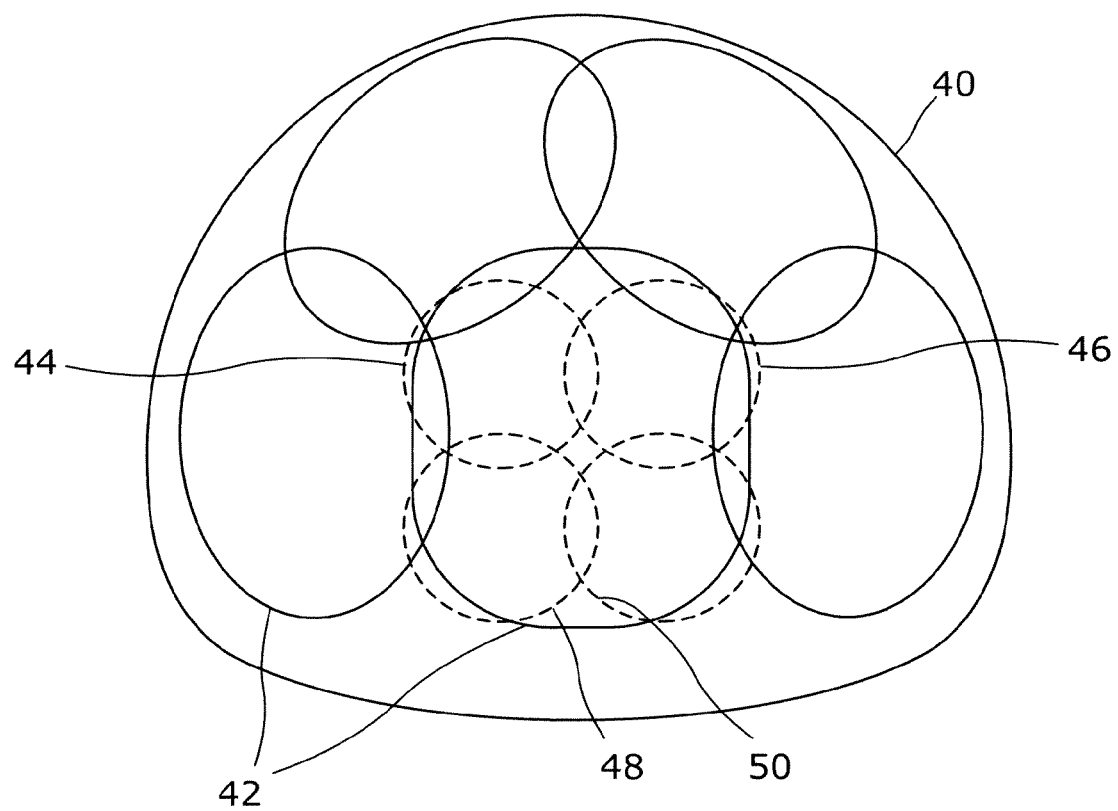
FIG. 4 shows approximate transmit and receive coverage for a five panel radar.

FIG. 4 shows approximately the coverage pattern for a five panel radar. The radar covers a span in azimuth of nominally 180°, and in elevation of nominally 90°, as indicated by ref. 40. Each panel has a transmit antenna, which has coverage indicated by the five smaller loops (drawn in a solid line) 42. Each panel has an array of 3 by 3 receive sub-antennas (not shown) in a square array, the outputs from each of which may be summed with those of another one or more sub-antennas to form one or more combined beams. The summation may also include changing the phase and/or amplitude of one or more of the signals from the elemental receive antennas to manipulate the width and/or direction of the combined beam(s) This allows narrower beams to be produced, and used for super-resolution techniques as previously mentioned. Receive beam 44 is produced by the vector sum of the signals from each of the nine elemental antennas, with appropriate phase steering being applied to achieve a desired direction of maximum sensitivity, Likewise, receive beam 46 is produced by similar vector summation, with different phase steering to direct the beam's maximum sensitivity in a different direction. Other beams e.g. 48, 50, may be made from other such summations and phase or amplitude adjustments being made, and used (such as with monopulse processing) to provide greater angular resolution of detected targets.

The receive beams 44, 46, 48 50 are all formed simultaneously using a digital beamformer, and so act as staring beams for the duration of activation of the particular panel.

As previously discussed, the coverage beam pattern of the radar is switched, so that only a sub-set (typically one) transmit beam 42, and its corresponding receive antennas and beams, are active at any given time, before switching to the next sub-set.

The invention claimed is:

1. A drone detection radar comprising: a plurality of antenna panel systems, each antenna panel system being configured to transmit, using a transmitter, a signal into an associated sector, and to receive, using a receiver, signals reflected from targets in the sector,
    wherein the sectors associated with the antenna panel systems collectively form a monitored volume, wherein a sub-set of the antenna panel systems are active at any one time, with the active sub-set of antenna panel systems being configured to monitor their respective volumes for a duration sufficient to measure Doppler signals associated with slow moving drones, with the radar being configured to switch to a different sub-set of antenna pane systems after each duration, such that the whole volume is monitored within a predetermined period,
    wherein each antenna panel system is arranged to monitor a sector approximately 60° in azimuth and 45° in elevation, and wherein each sub-set is arranged to monitor its respective sector(s) for up to 0.2 seconds before a switch to another sub-set occurs.

2. The radar as claimed in claim 1 wherein the whole volume is monitored within a period of every two seconds, every second, or every half second.

3. The radar as claimed in claim 1 wherein each sub-set of the antenna panel systems includes a single antenna system.

4. The radar as claimed in claim 1 wherein the radar includes five antenna panel systems, arranged to monitor a volume of nominally 180° in azimuth, and 90° in elevation.

5. The radar as claimed in claim 1 wherein each antenna panel system is connected to a common processor that is arranged to process digitised signals from each antenna panel systems, and to provide an alert if the signals are characteristic of being reflected from a drone.

6. The radar as claimed in claim 1 wherein the radar is arranged to vary a dwell time spent in a given sector according to whether a target has been detected within that sector.

7. The radar as claimed in claim 1 wherein each of the antenna panel systems comprises an antenna including a transmit antenna and a receive antenna.

8. The radar as claimed in claim 7 wherein each receive antenna includes of a plurality of elemental receive antennas each having a beam pattern that is configured to be combinable, in the radar, with beam patterns from one or more respective elemental receive antennas, to produce one or more narrower beams in a given direction.

9. The radar as claimed in claim 8 wherein the radar is adapted to manipulate the phase and/or amplitude of to the elemental receive beams during the combination with other beams, so as to tailor the beam direction of the one or more narrower beams.

10. A plurality of radars each configured according to claim 1, wherein each of the plurality of radars are arranged within a neighborhood, and are synchronized such that no two radars may transmit radiation within the same frequency band into a sector visible to two or more radars within the neighbourhood at a given time.

11. A plurality of radars each according to claim 1 wherein each of the plurality of radars is arranged within a neighborhood, and are synchronized, using an interface, such that no two radars are permitted to transmit towards each other simultaneously in the same frequency band.

12. The plurality of radars each according to claim 1 wherein each of the radars is arranged in a neighborhood, and are synchronized such that a first radar is configured to receive and process returns from targets of signals transmitted by a second radar.

* * * * *